April 29, 1969  D. M. FLORY  3,441,320

VEHICLE WHEEL BRAKE ANTILOCK SYSTEM AND METHOD

Filed Aug. 4, 1967  Sheet 1 of 3

INVENTOR.
Donald M. Flory
BY
D. D. McGraw
ATTORNEY

INVENTOR.
Donald M. Flory
BY
D. D. McGraw
ATTORNEY

April 29, 1969 D. M. FLORY 3,441,320
VEHICLE WHEEL BRAKE ANTILOCK SYSTEM AND METHOD
Filed Aug. 4, 1967 Sheet 3 of 3
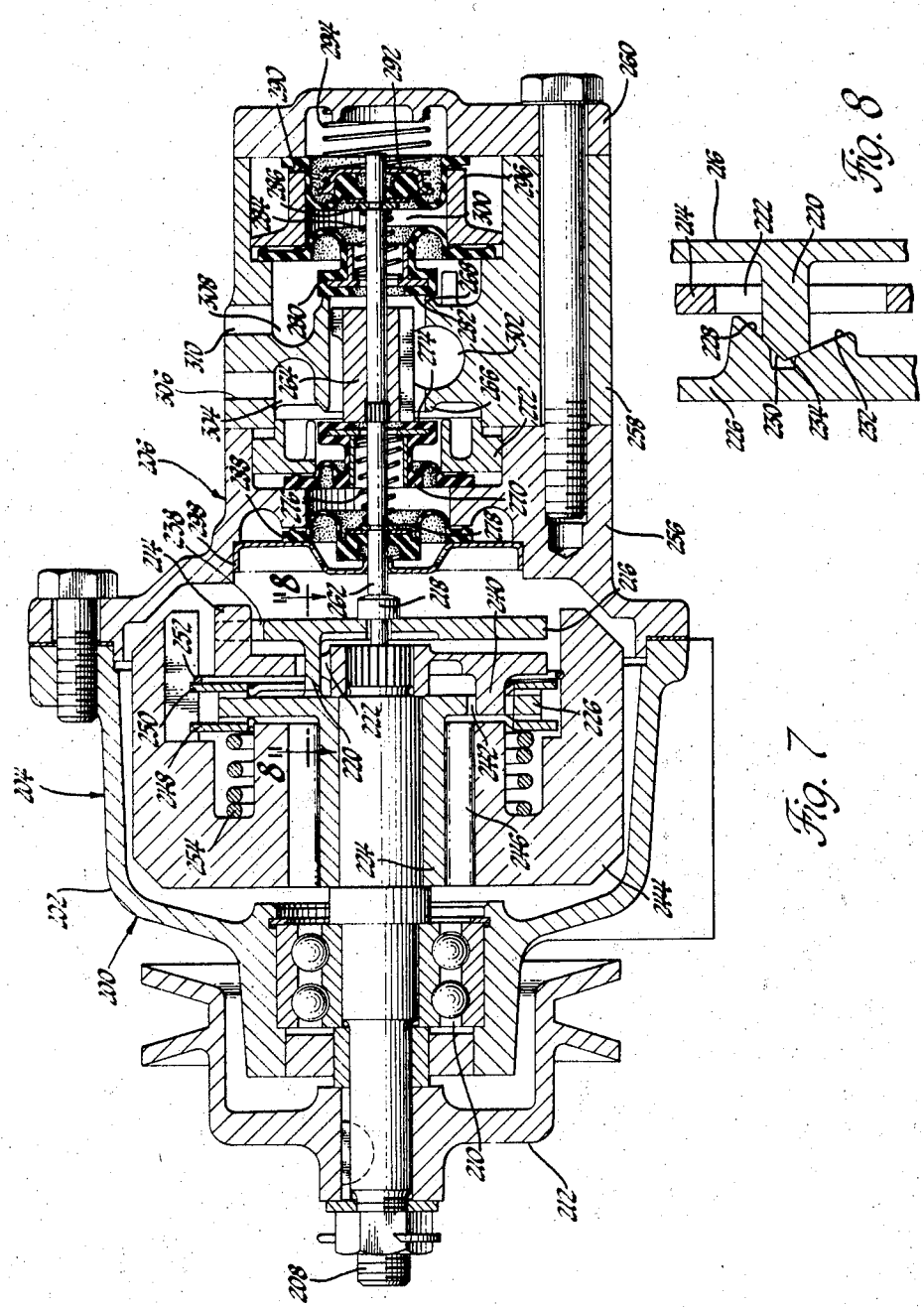
INVENTOR.
Donald M. Flory
BY
D. D. McGraw
ATTORNEY

United States Patent Office 3,441,320
Patented Apr. 29, 1969

3,441,320
VEHICLE WHEEL BRAKE ANTILOCK SYSTEM
AND METHOD
Donald M. Flory, Arcanum, Ohio, assignor to General
Motors Corporation, Detroit, Mich., a corporation of
Delaware
Filed Aug. 4, 1967, Ser. No. 658,420
Int. Cl. B60t 8/02, 13/00, 8/12
U.S. Cl. 303—21                                11 Claims

ABSTRACT OF THE DISCLOSURE

A vehicle wheel brake system and method of vehicle braking which utilize signals developed from wheel acceleration and deceleration rates to control a brake apply pressure modulator so as to cycle the pressures provided at the wheel brake to obtain a maximum braking effect without permitting the wheel slip to approach a full lock condition. The system and method use a unique control principle of the extremal type in which a brake apply pressure sufficient to cause substantially increasing wheel slip is released to permit wheel acceleration, and consequent decreasing wheel slip. The brake apply pressure is then held at a value permitting wheel acceleration, and, therefore, a decrease in wheel slip, while maintaining a brake torque on the wheel until the wheel acceleration ceases. The brake apply pressure is then again increased to cause wheel deceleration. The cycle is repeated as necessary.

Specification

The invention relates to a brake system and a method of braking operation, and more particularly to such a vehicle wheel brake arrangement. It has long been recognized that a vehicle wheel can be braked to such an extent that the effective braking force between the wheel and the road surface decreases even though the braking pressure applied to the wheel brake does not. This occurs when the wheel slip ratio increases sufficiently. If allowed to continue, the vehicle wheel brake will lock so that the wheel is no longer rotating, but is sliding on the road surface. It is advantageous to maintain the wheel in rolling contact with the road surface. The system and method embodying the invention utilizes the acceleration and deceleration characteristics of the wheel or wheels being braked and controlled so as to operate a brake apply pressure modulator to provide an extremal type of control. The brake apply pressure, and therefore the wheel brake applying force, is caused to cycle in accordance with conditions existing at the vehicle wheel so that the wheel is not permitted to be decelerated beyond a predetermined rate, which would result in such an increase in wheel slip as to substantially lessen the retarding force or torque exerted between the wheel and the road surface. A typical system cycle of operation is a brake apply, followed by a brake release to a lesser value, followed by a brake hold, followed by another brake apply. It is an important feature of the invention to sense the changes taking place which affect the brake retarding force so as to maintain a high average brake retarding force throughout the entire braking operation, such high average retarding force being considerably greater than the retarding force obtainable with a vehicle wheel locked against rotation while the vehicle is moving. The disclosed system and method embodying the invention use a three-signal sensing unit having an inertia actuation section and a control valve section. The inertia actuation section functions to sense positive and negative wheel accelerations and positions the valves in the valve section accordingly. The valves control differential pressures acting on a modulator, which in turn controls the brake apply pressure to the wheel brake. While the system is shown as being installed to control the vehicle rear wheel brakes, with wheel acceleration rates being sensed by driving the inertia actuation section from the vehicle drive shaft, the system can be utilized in other wheel brake combinations. It is feasible to utilize a complete system for each wheel brake if desired, to use one system for the front wheel brakes and another system for the rear wheel brakes, or any other desired combination of wheel brakes and systems.

In the drawings:

FIGURE 1 is a schematic illustration of a system embodying the invention, with parts broken away and in section.

FIGURES 2, 3 and 4 schematically illustrate various positions of the control valve assembly of FIGURE 1.

FIGURE 7 shows a modified sensing unit which may be connected into the system of FIGURE 1 in place of the sensing unit shown therein.

FIGURE 8 is a cross section view of a portion of the sensing unit of FIGURE 7, taken in the direction of arrows 8—8 of that figure.

Figure 1:
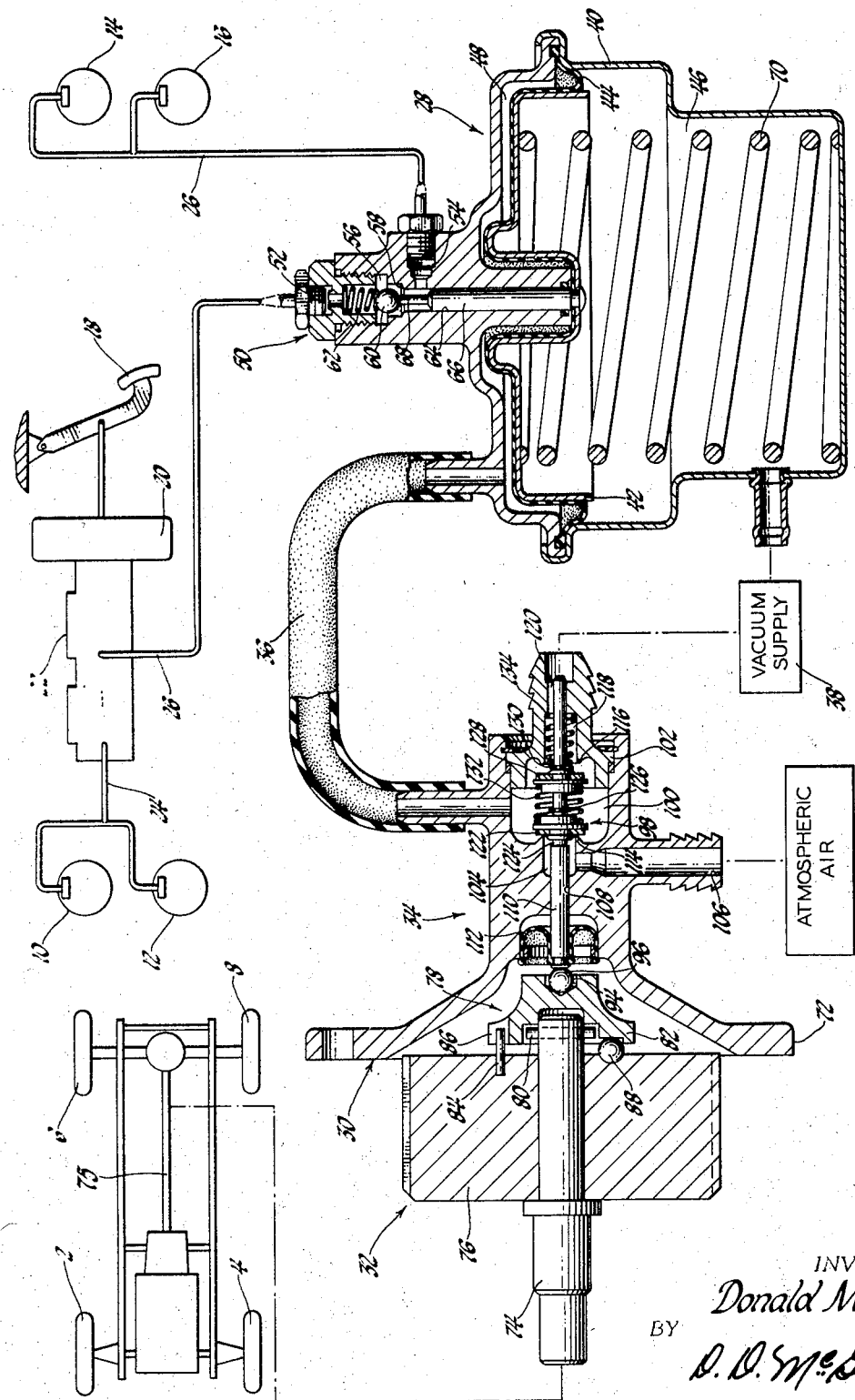

The vehicle braking system shown in FIGURE 1 includes front wheels 2 and 4 respectively provided with front wheel brakes 10 and 12, rear wheels 6 and 8 respectively provided with rear wheel brakes 14 and 16, and a brake pedal 18 connected to operate a brake booster 20, which in turn operates a dual chamber master cylinder 22. In the system illustrated, the front pressurizing chamber of the master cylinder is connected by conduit means 24 to the front wheel brakes 10 and 12, and the rear pressurizing chamber is connected by conduit means 26 to the rear wheel brakes 14 and 16. A brake apply pressure modulator 28 is fluid connected in the conduit means 26 so that it can modify the brake apply pressure furnished the rear wheel brakes 14 and 16. In this system, both rear wheel brakes are to be controlled by one sensor unit and one modulator. If desired, however, separate sensor units and modulators can be provided for each rear wheel brake. Also sensor units and modulators can be provided for the front wheel brakes. The three-signal sensor unit 30 has an inertia actuation section 32 and a valve section 34. The valve section is fluid connected by conduit 36 to the modulator 28 and is also suitably fluid connected to atmospheric air and a vacuum supply 38. The vacuum supply is also connected to the modulator 28. The vacuum supply may be the vehicle engine intake manifold.

The modulator 28 has a housing 40 in which a power piston 42 and a diaphragm 44 are positioned so as to divide the housing into a vacuum chamber 46 and a variable pressure chamber 48. The vacuum chamber 46 is connected to the vacuum supply 38. The variable pressure chamber 48 is connected by conduit 36 to the sensor valve section 34. The modulator housing 40 has a brake apply pressure control section 50 with a brake apply pressure inlet 52 and a brake apply pressure outlet 54. The control section 50 has a valve chamber 56 formed to provide a valve seat 58 and to contain valve 60 so that when the valve is seated on seat 58, no pressure or fluid can be transmitted from inlet 52 to outlet 54. When the valve is unseated, there is free fluid flow between the inlet and the outlet. Valve 60 is urged toward its seat by valve spring 62, with the valve being on the side of the seat toward inlet 52. A passage 64, formed to connect with chamber 56, contains a rod-like piston 66, which is connected at one end with the power piston 42 and has a pin-like end 68 extending into engagement with valve 60 so that the piston opposes the force of valve spring 62. Thus when the power piston 42 is moved to the position shown in FIGURE 1 by the power piston return spring 70, the piston 66 is in the upward position holding valve 60 off seat 58 and fluid connecting the inlet 52 and the outlet 54. Therefore any brake apply pressure generated by the master cylinder 22 in the conduit 26 is transmitted to the rear wheel brakes 14 and 16. This is the normal position of the modulator power piston since vacuum from vacuum supply 38 is normally found in chambers 46 and 48. When atmospheric pressure is admitted to chamber 48, under conditions to be described, the pressure overcomes the force of return spring 70 and moves the power piston downwardly as seen in the figure. This also moves piston 66 downwardly, allowing valve spring 62 to seat valve 60 on the seat 58, thereby preventing brake apply pressure from the master cylinder from being transmitted to the rear wheel brakes. Further downward movement of power piston 42 and piston 66 increases the volume of the upper end of passage 64 which is fluid connected to the outlet 54, thereby decreasing the brake apply pressure to the rear wheel brakes 14, 16. The pressure is therefore released to a lower level depending upon the stroke of piston 66, and is held at that lower level when the power piston 42 is held at some intermediate position due to the differential pressures acting thereon and the force of return spring 70. When vacuum is reapplied to chamber 48, the power piston 42 and the piston 66 move upwardly, unseating valve 60 and again permitting the master cylinder generated pressure to be applied to the rear wheel brakes.

Figure 3:
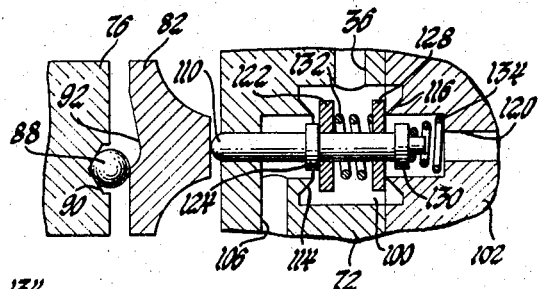
Figure 4:
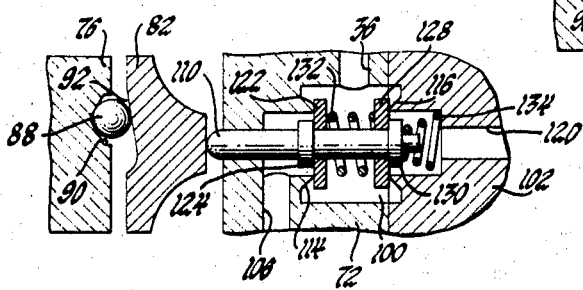

The sensor 30 has a housing 72, a portion of which is illustrated, with that portion containing the valve section 34. The inertia actuation section 32 includes a drive shaft 74 which is suitably driven by the vehicle drive shaft 75 when one sensor 30 is utilized to control both driving wheels 6 and 8. It is contemplated that the drive shaft 74 may be driven by any wheel or group of wheels to be controlled by one modulator. The flywheel 76 is rotatably mounted on the shaft 74 and is driven through a drive assembly 78. This assembly includes a cross pin 80 extending through the inner end of the drive shaft 74 and in a slot formed in the cam 82. The cam 82 is therefore rotated by the drive shaft. A pin 84 in the flywheel extends into a slot 86 formed in the outer periphery of the cam to provide a limitation of relative movement in either direction between the flywheel and the cam. An arrangement of cam balls 88, which may be three in number and circumferentially equally spaced, engage the flywheel 76 and the cam 82, as more particularly shown in FIGURES 2, 3 and 4. Essentially, each ball 88 fits in a depression 90 formed in the flywheel side and rides in a shaped slot 92 formed in the face of cam 82 adjacent the flywheel end surface. The other end of the cam opposite drive shaft 74 has a depression 94 receiving a ball 96 on the axis of the drive shaft and cam. The ball permits rotary movement of the cam, as well as the axial transmission of forces from the cam to portions of the valve assembly described below.

The valve assembly 98 is positioned within the housing 72. The housing is formed to provide a valve chamber 100 closed at one end by a cap or plug 102. The chamber 100 has a center chamber portion fluid connected with conduit 36, and a smaller chamber portion 104 connected to the atmospheric air passage 106. The housing 72 has a bore 108 connecting chamber portion 104 with the portion of the housing containing the cam 82. A valve rod 110 is slidably mounted in bore 108 and has one end extending outwardly of the bore and in axial force-transmitting relation with ball 96. A suitable seal such as the rolling diaphragm seal 112 seals the bore 108 and the rod 110 to prevent atmospheric leaks through the bore. The housing 72 has an annular valve seat 114 formed about the end of the chamber section 104 opening into the main portion of the chamber. The plug 102 has a similar valve seat 116 which is in axially spaced alignment with seat 114 and on the opposite side of the chamber. A spring chamber 118 extends from valve seat 116 away from chamber 100 and is fluid connected by suitable circumferentially spaced slots 120 with the conduit from the vacuum supply 38. The end of valve rod 110 opposite cam 82 is slidably positioned in the plug 102 adjacent the slots 120. The hold valve 122 is slidably received on rod 110 and is positioned on the rod by the valve stops 124 and 126 so that sliding movement of the valve on the rod is limited. A similar release valve 128 is mounted on the rod 110 between the valve stop 126 and the valve stop 130. A spring 132 urges the valves apart and into engagement with stops 124 and 130. A spring 134 in chamber 118 engages the valve stop 130 and urges the entire valve assembly to the left so that the end of rod 110 always engages ball 96 and holds the drive assembly 78 in driving relation.

Figure 2:
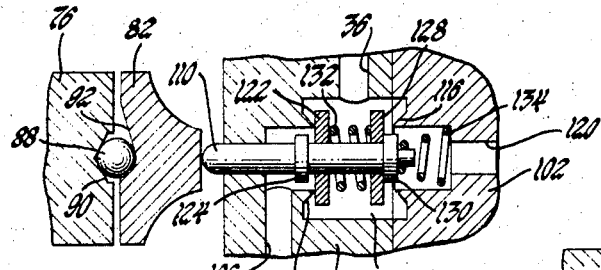

The drive assembly 78 is normally in the position shown in FIGURES 1 and 2, and the valve assembly is therefore normally in the position shown in those figures. The hold valve 122 is seated on valve seat 114 and the release valve 128 is unseated relative to valve seat 116. The conduit 36 is connected with the vacuum supply 38 and is disconnected from the atmospheric air passage 106. Therefore vacuum is applied to chambers 46 and 48 of the modulator 28 and the brake system permits full brake apply pressure from the master cylinder 22 to be applied to the rear wheel brakes 14 and 16. This condition exists at all times, whether the vehicle is operating or not, so long as the deceleration and acceleration rates of the drive shaft 74 and the flywheel 76 are insufficient to cause relative movement of the flywheel and the cam 82 in either direction. The modulator return spring 74 would hold the modulator in the brake pressure apply position even if the vehicle engine (which is the usual source of vacuum) were not operating. In that instance the pressures in chambers 46 and 48 would be atmospheric, would balance out, and the only force on power piston 42 would be that of spring 70.

Assuming the vehicle to be traveling at some speed when the operator actuates the brake pedal 18, brake pressure is created in brake conduits 24 and 26 and distributed to the front and rear wheel brakes. If the operator should apply sufficient brake pressure to cause the vehicle wheel or wheels operatively driving the drive shaft 74 to decelerate at a greater rate than would be permitted with no wheel slip, wheel slip will occur. This simply means that the vehicle is moving faster than the vehicle wheel at the road surface, so that a pure rolling contact no longer occurs. It has been found that the effective retarding force exerted between the wheel and the road surface will increase to some extent under most road surface conditions as the wheel slip increases, and will then decrease as wheel slip continues to increase. If the wheel slip is permitted to continue to increase, the wheel will become locked against rotation while the vehicle is still moving, and much less effective brake retarding force will be obtained. Therefore, when the flywheel 76 senses a predetermined deceleration rate, it overruns the drive shaft 74, with the results shown in FIGURE 3. The cam 82 is moved axially to the right as seen in the drawings, moving rod 110 to the right, causing the release valve 128 to be seated against valve seat 116 and the hold valve 122 to be unseated relative to valve seat 114. This permits atmospheric presure to enter the modulator chamber 48, causing the power piston 42 to move downwardly, first cutting off the presure generated by the master cylinder and then relieving the brake pressure at the wheel brakes 14 and 16. This release or relief of pressure is sufficient to permit the rear wheels, in the installation shown, to accelerate. When this acceleration occurs, the flywheel 76 underruns the drive shaft 74, causing the cam assembly to assume the position shown in FIGURE 4. Due to the shape of the cam slot 92 and the limitation on relative rotation imposed by pin 84, the cam 82 is moved to the right only sufficiently far to close the release valve 128 against valve seat 116 but not far enough to unseat the hold valve 122 relative to seat 114. Thus both valves are closed and the pressure existing in chamber 48 of the modulator is maintained. This likewise maintains the lower presure existing at the rear wheel brakes 14 and 16 which permitted wheel acceleration. The pressure at the wheel brakes is held until the wheel slip ratio decreases to a point where there is substantially no more wheel acceleration. The cam assembly then returns to the position shown in FIGURE 2, as does the valve assembly. Vacuum is therefore again applied to chamber 48, valve 60 is opened, and the brake apply pressure being generated by the master cylinder in conduit 26 is transmitted to the rear wheel brakes. If the operator has maintained sufficient force on the brake pedal during this cycle, the brake apply pressure may be sufficient to again cause the vehicle wheels to decelerate at a rate sufficient to cause the cycle to reoccur. In actual practice, under a panic stop condition, the cycle will be repeated several times as the vehicle slows to a stop, without permitting the controlled wheel brakes to lock the wheels associated therewith.

Figure 5:
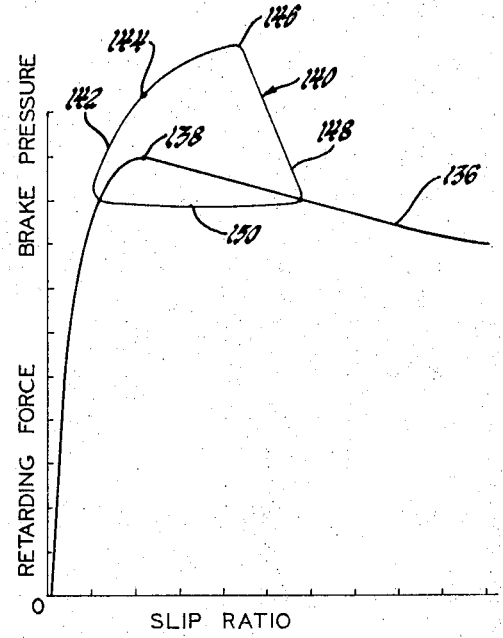
FIGURE 5 shows a wheel slip ratio curve plotted against retarding force and also a brake pressure signal plotted against wheel slip ratio.
Figure 6:
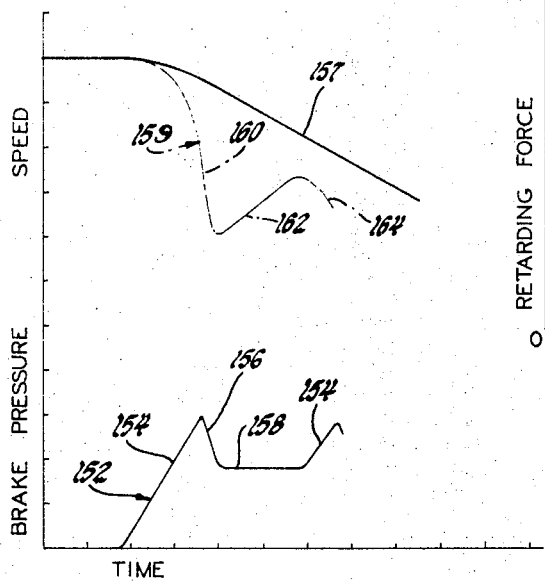
FIGURE 6 shows curves indicating the brake pressures, the vehicle speed, and the wheel speed as the system passes through a cycle of operation.

The operation of the system is shown by the charts of FIGURES 5 and 6. FIGURE 5 has a curve 136 which plots wheel slip ratio against the retarding force obtained between the wheel and the road surface under a particular road surface condition. If, for example, the road surface has a coefficient of friction of 0.7, the curve will be relatively high as indicated. If, however, the road is more slippery, such as ice or snow, the curve will have the same general characteristics but will peak at a much lower retarding force. With the particular curve shown it can be seen that the maximum retarding force is obtained when the wheel slip ratio is a point 138. Curve 140 is a closed loop curve plotting brake apply pressure at the wheel brake in relation to wheel slip ratio. It can be seen that as brake presure is applied in accordance with portion 142 of curve 140, the wheel slip will increase and so will the retarding force. However, when the brake pressure reaches point 144, a further pressure increase causes further wheel slip ratio increase but a decreasing retarding force. The rate of increase of wheel slip ratio is wheel deceleration rate, and at point 146 this rate is sufficient to cause flywheel 76 to overrun drive shaft 74 and cause the modulator 28 to release the pressure applied to the wheel brakes 14 and 16. Thus the brake pressure curve follows the section 148 of curve 140. The brake pressure is decreased sufficiently to permit the rear wheels to begin to accelerate, and the flywheel then shifts the valve assembly to the hold condition of FIGURE 4. This portion of the brake pressure curve is shown in curve section 150. At this time the wheel slip ratio will be decreasing and the retarding force, indicated by curve 136, will increase. When the retarding force equals the brake force on the wheel brake, the wheel will no longer accelerate. At this time the flywheel acts to move the valve assembly to the position shown in FIGURE 2 and the brake pressure is reapplied.

The curves shown in FIGURE 6 show the brake pressure, vehicle speed, and wheel speed plotted against time. The brake pressure curve 152 has portions 154, 156 and 158 respectively corresponding to the portions 142, 148 and 150 of closed loop curve 140. The vehicle speed curve 157 shows the vehicle slowing down when the brakes are applied. The wheel speed curve 159 shows the wheel decelerating in portion 160, accelerating portion 162 and again decelerating portion 164. A comparison of the curves shows that the hold pressure exists while the wheel accelerates along portion 162 and that the full brake apply pressure is reapplied to cause the wheel to again decelerate along portion 164.

The modified sensor 200 shown in FIGURES 7 and 8 includes a housing 202 containing the inertia actuation section 204 and the valve section 206. The drive shaft 208 is mounted on suitable bearings 210 in one end of the housing. A drive pulley 212 is secured to the shaft outer end for rotatably driving the shaft 208. The drive pulley may be suitably connected to be driven from the vehicle propeller shaft or one or more vehicle wheels, as more fully discussed above with regard to the manner of driving shaft 74. The inner end of drive shaft 208 has a cam driver 214 secured thereto in driving relation. The cam 216 is rotatably mounted about the shank of thrust button 218, which is positioned so that it extends into a recess in the inner end of the drive shaft 208 to transmit axial thrust. The cam 216 has tangs 220 extending through suitable openings 222 in cam driver 214 so as to engage camming surfaces formed on the torque drum 224. This drum is rotatably mounted on shaft 208 and has a flange 226 on which the camming surfaces engaged by tangs 220 are formed. A suitable number of cam tangs and torque drum camming surfaces may be provided in a circumferentially spaced manner. In the example shown, three such sets of tangs and camming surfaces are provided. FIGURE 8 shows the camming relationship of one such set of tangs and surfaces. The camming surface 228 on the torque drum flange 226 is provided to engage a corresponding cam surface 230 formed on tang 220. The camming surface 232 on the torque drum flange 226 is in cam engaging relation with the cam surface 234 of cam tang 220. For reasons to be described below, the camming surface 228 extends axially a considerable distance further than does the camming surface 232. It also has a higher rise angle.

The flywheel 244 is mounted so as to be rotatable on the cylindrical portion of torque drum 224, and a sprag clutch 246 is preferably provided between the flywheel and the torque drum cylindrical portion to permit the clutch to drive the flywheel during vehicle wheel deceleration but allowing the flywheel to overrun the torque drum during vehicle wheel acceleration.

The torque drum flange 226 extends outwardly beyond the camming surfaces and is engageable on its opposite sides by an inner clutch plate assembly 248 and an outer clutch plate assembly 250. The clutch plate assemblies are spline connected to the flywheel and retained in position by a retainer 252. The face clutch spring 254 urges the clutch plate assembly and the torque drum flange into clutching engagement.

The cam driver 214 is provided with a cam driving tang 236 which engages a slot 238 formed in the cam 216 so as to rotatably drive the cam while permitting relative axial movement between the cam and the cam driver. The cam driver is provided with another tang 240 which extends through an arcuate slot 242 formed in the torque drum flange 226 radially intermediate the cam surfaces. The arcuate slot 242 extends circumferentially a suitable distance to permit the desired amount of relative movement of the torque drum flange and the cam while preventing the cam surfaces of tangs 220 from completely disengaging either the camming surfaces 228 or the camming surfaces 232 of the torque drum flange.

The valve section 206 has a valve housing section 256 secured to the portion of the housing containing the flywheel, clutch and cam assembly. Another valve housing section 258 is secured to the housing section 256 and is closed by an end cap 260. Suitable bores are provided through valve housing sections 256 and 258 on an axis common with the axis of rotation of drive shaft 208 so that the push rod 262 extends therethrough with one end in engagement with the head of thrust button 218 and the other end terminates in spaced relation to the end cap 260. The center portion of valve housing section 258 slidably receives the push rod guide 264, which is secured to the center portion of the push rod 262, and is provided with oppositely-extending annular valve seats 266 and 268. The hold valve and diaphragm assembly 270 extends about the valve push rod 262, is held and guided in place by the valve guide 272, and includes the hold valve face 274 which is positioned to engage valve seat 266 and for movement away from the valve seat by engagement with the valve guide 264, which is mounted for axial movement with the push rod 262. The hold valve spring 276 urges the valve face 274 toward its seat 266 and reacts against the spring retainer 278, which is secured to the push rod. The release valve and diaphragm assembly 280 is similar to the assembly 270, with the release valve face 282 being urged toward seating engagement with the valve seat 268 by the release valve spring 284. This spring reacts against the spring retainer 286 which is secured to the push rod 262. Balancing diaphragms 288 and 290 are secured at opposite ends of the bores formed through valve housing sections 256 and 258 and extend about the ends of the push rod 262. A diaphragm and spring retainer 292 fits about the end of the push rod adjacent end cap 260 and provides a seat for the preload spring 294 which thus reacts against the end cap 260 and acts through the spring retainer 292, the center portion of the balancing diaphragm 290, and the spring retainer 286 to urge the push rod 262 and guide 264 to the left, as seen in the drawing, and into engagement with the head of thrust button 218. The diaphragm support and spacer 296 is positioned between the radially outer portions of the diaphragm assembly 280 and the balancing diaphragm 290 to hold them in position in the housing. A diaphragm retainer 298 holds the balancing diaphragm 288 in position in the valve housing section 256.

The valve housing sections are therefore divided into several chambers, with atmospheric pressure acting on the outer sides of the balancing diaphragms 288 and 290, an annular chamber 300 extending about the push rod and valve assembly from balancing diaphragm 288 to balancing diaphragm 290, through the annular hold and release valve assemblies 270 and 280, and through the portion of valve housing section 258 between the valve seats 266 and 268. This chamber 300 is connected with the modulator port 302, which transmits whatever pressure exists in that chamber to a brake pressure modulator such as modulator 28 of the system of FIGURE 1. A vacuum chamber 304 is formed by housing section 258 and the valve guide 272 and is radially outward of valve seat 266 so that it is connected with chamber 300 when the hold valve is unseated, but is disconnected when the hold valve is seated. A suitable port 306 connects chamber 304 with a vacuum supply source. A third chamber 308 is an atmospheric pressure chamber connected to the atmosphere by port 310 and is formed in valve housing section 258 radially outward of release valve seat 268 so that it is connected with chamber 300 when the release valve face 282 is unseated relative to seat 268, and is disconnected from chamber 300 when face 282 is seated on seat 268.

As the vehicle wheel or wheels which operatively drive pulley 212 change speed of rotation, the sensor 200 must have the same relative change in the speeds of its drive shaft 208, cam driver 214, and cam 216. The inertia of the flywheel 244 causes the flywheel to exert a torque against the clutch plates 248 and 250 and therefore against the flange 226 of the torque drum. When the flywheel torque exceeds the torque capability of the clutch arrangement, the flywheel overruns relative to the torque drum 224 during wheel accelerations due to an increase in speed of the drive shaft 208. As noted above, the sprag clutch 246 will prevent the flywheel from overrunning the torque drum during decelerations, and therefore the torque drum under deceleration conditions will rotate at the same speed as the flywheel. The flywheel torque is transmitted through the torque drum to the torque drum camming surfaces 228 and 232. During decelerations, the camming surface 228 acts to drive the cam 216 through the cam surface 230. When sufficient axial force is produced by the reaction of these surfaces to overcome the force of the valve preload spring 294 acting through the push rod 262, the cam indexes axially and arcuately with respect to the torque drum. The relative motion between the cam 216 and the torque drum 224 results in linear travel of the cam against the thrust button 218 and therefore against the push rod 262. The linear movement of the push rod 262 and guide 264 to the right, as seen in the drawing, permits the hold valve spring 276 to move the hold valve 270 until the valve face 274 engages the valve seat 266, thereby closing off the vacuum supply chamber 304 from the modulator port 302. As can be seen in FIGURE 7, the hold valve is normally unseated and the release valve is normally seated due to action of the preload spring 294 so that the modulator port 302 is normally connected to the vacuum supply through chamber 304 and port 306. Continuation of travel of the push rod 262 under influence of the camming action causes the push rod guide 264 to engage the release valve face 282 and to act against the force of release valve spring 284 to prevent further expansion of that spring and then lift off the release valve face 282 from its seat 268. This opens the modulator port 302 to the atmospheric air supply through chamber 308 and port 310. When the vehicle wheel or wheels operatively driving pulley 212 have decelerated at a rate which causes the cam faces 228 with a full rise to be activated so that the valve is moved to the right as above described, the modulator in the system is activated as described above with regard to FIGURE 1. When the vehicle wheel or wheels driving pulley 212 then accelerate, the cam surfaces 232 are caused to act. The rise of these cam surfaces and their cooperating surfaces 234 on cam 216 is only sufficient to move the push rod 262 and guide 264 to the right a sufficient distance to close the hold valve face 274 against its seat 266. Thus when these cam surfaces act due to acceleration, both the hold and release valves are closed and the modulator port 302 is closed and there is no air flow and therefore no pressure change delivered to the modulator.

With the reduction of wheel acceleration, the torque from the flywheel 244 is diminished. When the reaction force on the valve push rod 262 exceeds the force generated at the cam, the cam surfaces cause the cam 216 and the torque drum 224 to move relatively with respect to each other so that the cam surfaces are returned to their neutral or center position shown in FIGURE 8. This positions the hold and release valves so that the vacuum supply is connected to the modulator port.

The clutch assembly in the flywheel has two functions. The first is a safety feature in that it limits the inertia forces generated during acceleration and transmitted into the valve section. Secondly, it provides the sensor with the ability to extend its capability to recover from a wheel lock. This is accomplished by the overrunning flywheel. As long as the flywheel is overrunning on vehicle wheel deceleration, it is maintaining the valve section in the brake release position. When this release is sufficiently long to allow adequate wheel brake pressure reduction, wheel acceleration is obtained. The wheel aceleration will result in obtaining a brake pressure hold signal which will maintain a brake apply pressure while still allowing the wheels to accelerate toward vehicle speed. Full brake apply pressure is again permitted when insufficient wheel acceleration exists to create the hold torque which causes the clutch assembly to slip.

It is within the scope of the invention as herein disclosed and claimed to maintain the lower brake apply pressure, during portions 150 of curve 140 and 158 of curve 152 between pressure limits established as the pressure which permits the wheel acceleration to begin after the release phase, and the somewhat higher pressure which still permits wheel acceleration, increase in brake torque, and a decrease in wheel slip ratio. In such operation, the brake apply pressure could be increased during this phase but would not exceed the defined limits.

While the invention is herein shown and described as applied to a system incorporating a mechanical accelerometer sensing unit, vacuum and atmospheric air pressure controls, and a hydraulic pressure braking system, it is within the scope of the invention as exemplified by apparatus and method that other types of sensing mechanisms may be used. By way of example only, the sensor unit may be electrical, pneumatic or hydraulic, or a combination thereof. Likewise the signal controls, here shown as valves, may be electrical, electronic or hydraulic. The modulator may be arranged to be compatible with such signals as the sensor and signal control mechanisms may cause to occur. The type of vehicle braking system controlled by the modulator may be other than hydraulic, such as positive air pressure, electrical, or electro-magnetic in nature. The inventive method may be practiced by utilization of different mechanisms from that specifically shown and described, with some of the steps capable of being carried out by hand, so long as the principle of cycling the brake apply in the manner above described is utilized.

What is claimed is:

1. In a vehicle wheel brake control system having
  a wheel brake pressurizing circuit, and
  means sensing vehicle wheel acceleration and deceleration, and
  vehicle brake pressure modulating means in said circuit, the improvement comprising:
    means responsive to vehicle wheel acceleration and deceleration as sensed by said sensing means
      to control said modulating means,
        to generate a wheel braking pressure cycle upon wheel deceleration and acceleration changes in which
          a brake apply pressure in said circuit which causes the vehicle wheel to decelerate beyond a predetermined rate is released to a lower apply pressure at which the wheel accelerates,
          followed by a pressure hold at the lower apply pressure while the wheel continues to accelerate,
          followed by reapplication of the available brake apply pressure in the circuit to the wheel brake.

2. In a vehicle brake system having a vehicle wheel provided with a wheel brake, a master cylinder, and a brake line fluid pressure connecting said master cylinder and said wheel brake; a vehicle wheel brake antilock mechanism comprising:
    a housing having a vacuum inlet and an atmospheric inlet and a controlled pressure outlet and valve means having a first position connecting said vacuum inlet to said outlet and a second position connecting said atmospheric inlet to said outlet and a third position closing said outlet relative to said inlets,
    means movable in said housing to selectively position said valve means in each of said positions,
    a drive shaft rotatably mounted in said housing and operatively driven by said vehicle wheel,
    flywheel means mounted on said drive shaft and drivingly connected therewith and having limited rotational movement relative thereto,
    cam means drivingly interconnecting said flywheel means and said drive shaft and actuable by movements of said flywheel rotationally relative to said drive shaft in response to positive and negative vehicle wheel acceleration rates to selectively position said valve means
      in said first position when the vehicle wheel acceleration rates are within predetermined limits,
      and in said second position when the vehicle wheel negative acceleration are exceeds a predetermined negative value and in said third position when the vehicle wheel reaches a predetermined positive acceleration rate immediately after having exceeded the predetermined negative acceleration rate value,
    and a brake pressure modulator controlled by said output pressure and positioned in said brake line to selectively,
      permit full brake apply pressure to be delivered to the vehicle wheel brake when said valve means is in said first position,
      and to release said brake apply pressure to a lesser value when said valve means is in said second position,
      and to hold said brake apply pressure at a lesser value when said valve means is in said third position.

3. A vehicle wheel brake system having a brake pressure source capable of delivering a brake apply pressure to a wheel brake sufficient to cause increasing wheel slip, means sensing wheel deceleration as a function of increasing wheel slip and decreasing retarding torque at the road surface and acting at a predetermined wheel deceleration rate to release the brake apply pressure supplied to the wheel brake to a lower pressure level to cause wheel acceleration and decreasing wheel slip and increasing retarding torque at the road surface,
    said sensing and acting means further sensing wheel acceleration as a function of decreasing wheel slip and increasing retarding torque at the road surface and acting to hold the brake apply pressure supplied to the wheel brake at a pressure level permitting decreasing wheel slip and a constant brake torque and increasing retarding torque at the road surface,
    said sensing and acting means further sensing the loss of wheel acceleration as the retarding torque at the road surface increases to equal the brake torque and acting to reapply source brake pressure to the wheel brake up to the source pressure level.

4. A three condition vehicle wheel brake antilock system comprising:
    means actuated by vehicle wheel speed and producing
      a first signal at a predetermined wheel deceleration rate,
      a second signal at a predetermined wheel acceleration rate following production of said first signal,
      and a third signal when the wheel decelerates following production of said second signal and at any other time when said first or second signals are not produced;
    a brake pressurized circuit having a brake pressure modulator therein intermediate a source of braking pressure and the vehicle wheel brake;
    and control means for said modulator receiving said signals and having
      one condition wherein said modulator permits full brake apply pressure to be delivered to the vehicle wheel brake from the source of braking pressure so long as said third signal is produced,
      a second condition wherein said modulator decreases the brake apply pressure delivered to the vehicle wheel brake sufficiently to permit the vehicle wheel to accelerate so long as said first signal is produced,
      and a third condition wherein said modulator maintains a constant brake apply pressure which permits wheel acceleration while maintaining constant brake torque so long as said second signal is being produced,
    said control means returning to said one conditon when said third signal is again produced.

5. A vehicle wheel brake antilock system comprising:
    a vehicle road-engaging wheel having a wheel brake actuable by brake pressure selectively applied thereto;
    a master cylinder and conduit means fluid pressure connecting said master cylinder and said wheel brake;
said master cylinder being actuable to pressurize fluid in said conduit means at various pressure levels including a sufficiently high pressure level to cause the vehicle wheel to slip relative to the road surface to first increase and then decrease retarding force at the road surface as the wheel slip ratio increases;

an accelerometer operatively driven in accordance with the rotational speed of the wheel and sensing positive and negative wheel accelerations and generating a first signal indicating insufficient brake action of the wheel brake to cause any substantial decrease in retarding force on the wheel at the road surface accompanied by an increase in wheel slip ratio, a second signal indicating an increasing wheel slip ratio accompanied by a decreasing retarding force on the wheel at the road surface, and a third signal indicating a decreasing wheel slip ratio accompanied by an increasing retarding force on the wheel at the road surface;

a three-position control valve assembly receiving said signals and assuming a different control position for each signal received;

a wheel brake apply pressure modulator in said conduit means fluidly intermediate said master cylinder and said wheel brake and controlled by said valve assembly to any one of three conditions of modulator operation respectively comparable to the three-valve assembly control positions which are in turn respectively caused by the three-accelerometer generated signals;

the first modulator condition of operation permitting brake pressure to be applied to the wheel brake at the pressure levels supplied by the master cylinder during the time that the first signal is generated by the accelerometer, the second condition of operation of the modulator releasing the wheel brake applied pressure to a lower pressure level when said second signal is generated by said accelerometer to cause wheel acceleration and a decreasing wheel slip ratio and an increasing retarding force on the wheel at the road surface, and a third condition of operation when said accelerometer generates said third signal to hold the brake-applied pressure supplied to the wheel brake at a pressure level permitting a decreasing wheel slip ratio and an increasing retarding force on the wheel at the road surface with a constant brake torque applied to the wheel by the wheel brake, said modulator assuming the first condition of operation when the first accelerometer signal is again generated to permit reapplication of brake pressure to the wheel brake at any pressure level supplied by the master cylinder.

6. A method of vehicle wheel brake operation comprising the steps of:
(a) pressurizing a vehicle wheel brake to decelerate the vehicle wheel at a rate causing wheel slip,
(b) sensing the deceleration rate of the vehicle wheel and at a predetermined excessive deceleration rate releasing vehicle wheel brake apply pressure to reduce that apply pressure and permit the vehicle wheel to accelerate,
(c) sensing the acceleration of the vehicle wheel and holding the vehicle wheel brake apply pressure substantially at that apply pressure existing when the wheel acceleration was sensed,
(d) continuing to sense the vehicle wheel acceleration and, when the wheel acceleration decreases to a predetermined value, reapplying pressure to the vehicle wheel brake to further decelerate the vehicle wheel,
(e) and repeating steps (b), (c) and (d) in sequence when the sensed vehicle wheel deceleration rate again reaches the predetermined excessive deceleration rate.

7. A method of vehicle wheel brake operations comprising the steps of:
(a) sensing the vehicle wheel acceleration and deceleration rates,
(b) pressurizing the vehicle wheel brake to decelerate the vehicle wheel at a rate causing wheel slip,
(c) at a predetermined excessive wheel deceleration rate releasing the wheel brake apply pressure sufficiently to permit the vehicle wheel to accelerate,
(d) upon a predetermined wheel acceleration rate holding the wheel brake apply pressure substantially at that reduced apply pressure existing when the predetermined wheel acceleration was sensed,
(e) upon sensing substantially zero wheel acceleration reapplying pressure to the wheel brake to further decelerate the vehicle wheel,
(f) and repeating the steps (c), (d), and (e) when the sensed wheel deceleration rate causes step (c) to commence.

8. A method of wheel brake operation comprising the steps of:
(a) sensing wheel accelerations as indicia of changes in wheel retarding force;
sequentially
(b) increasing the wheel brake applying force to increase the wheel brake torque and the wheel retarding force thereby negatively accelerating the wheel,
(c) releasing the wheel brake applying force, upon a decrease in wheel retarding force indicated by the sensed wheel negative acceleration, to a lower force value to decrease the wheel brake torque to a lower value permitting the wheel to positively accelerate,
(d) maintaining a constant wheel brake applying force and a constant wheel brake torque during positive wheel acceleration until the wheel retarding force increases to become substantially equal to the wheel brake applying force,
(e) and repeating step (b);
(f) and cycling wheel brake applying force and wheel brake torque in response to changes in wheel accelerations by repeating the sequential steps (c), (d), and (e) each time a greater negative wheel acceleration indicates a decrease in the wheel retarding force.

9. A method of vehicle wheel brake operation comprising the steps of:
(a) pressurizing a vehicle wheel brake to decelerate the vehicle wheel at a rate causing wheel slip,
(b) sensing the deceleration rate of the vehicle wheel and at a predetermined excessive deceleration rate releasing vehicle wheel brake apply pressure to reduce that apply pressure to a lower pressure level which permits the vehicle wheel to commence to accelerate,
(c) sensing the acceleration of the vehicle wheel and applying the vehicle wheel brake apply pressure within limits with the lower apply pressure limit being substantially at that apply pressure existing when the wheel acceleration was sensed and the upper apply pressure limit being that which will increase wheel brake torque while continuing to permit wheel acceleration and consequent decreasing wheel slip,
(d) continuing to sense the vehicle wheel acceleration and, when the wheel acceleration decreases to a predetermined value, reapplying pressure to the vehicle wheel brake to further decelerate the vehicle wheel,
(e) and repeating steps (b), (c), and (d) in sequence when the sensed vehicle wheel deceleration rate again reaches the predetermined excessive deceleration rate.

10. A three-condition vehicle wheel brake antilock system comprising:
means actuated by vehicle wheel speed and producing a first signal at a predetermined wheel deceleration rate, a second signal at a predetermined wheel deceleration rate following production of said first signal, and a third signal when the wheel decelerates following production of said second signal and at any other time when said first or second signals are not produced;

a brake pressurizing circuit having a brake pressure modulator therein intermediate a source of braking pressure and the vehicle wheel brake;

and control means for said modulator receiving said signals and having one condition wherein said modulator permits full brake apply pressure to be delivered to the vehicle wheel brake from the source of braking pressure so long as said third signal is produced, a second condition wherein said modulator decreases the brake apply pressure delivered to the vehicle wheel brake sufficiently to permit the vehicle wheel to accelerate so long as said first signal is produced, and a third condition wherein said modulator maintains the brake apply pressure within limits with the low limit being that brake apply pressure which permits wheel acceleration while maintaining constant brake torque so long as said second signal is being produced and the high limit being the highest brake apply pressure which permits wheel acceleration while increasing brake torque and decreasing wheel slip ratio while said second signal is being produced, said control means returning to said one condition when said third signal is again produced.

11. A method of controlling the action of a vehicle wheel brake for a vehicle having a wheel-to-road surface retarding force versus wheel slip ratio characteristic that has progressively increasing retarding force with increased slip ratio to a peak and progressively decreased retarding force with increased slip ratio beyond the peak, said method comprising the steps of:

(a) applying braking pressure to a vehicle wheel brake to generate sufficient wheel brake torque to decelerate the vehicle wheel through a slip ratio in excess of the slip ratio value at said peak;

(b) sensing vehicle wheel deceleration and reducing the vehicle wheel brake apply pressure to a lesser value when sensed wheel deceleration exceeds a predetermined value, the amount of such reduction being sufficient to reduce the wheel brake torque to a value less than the torque produced by the wheel-to-road surface retarding force and thereby permit the slip ratio to decrease;

(c) sensing vehicle wheel acceleration and at a predetermined value thereof maintaining substantially constant vehicle wheel brake apply pressure at such a lesser value and continuing braking action with corresponding increased wheel-to-road surface retarding force and decreased wheel slip ratio until the peak of the characteristic is at least attained;

(d) sensing further changes in the vehicle wheel acceleration and in accordance therewith and after the characteristic peak has been attained applying more braking pressure to the vehicle wheel brake to increase the wheel brake torque and the wheel-to-road surface retarding force until the characteristic peak is again exceeded;

(e) and repeating steps (b), (c), and (d) to cycle the wheel brake apply pressure in a closed loop having an apply-release to a lesser value-hold-reapply characteristic so as to cause the wheel-to-road surface retarding force versus wheel slip ratio characteristic to cycle through the characteristic peak while at all times having substantial wheel brake torque.

References Cited

UNITED STATES PATENTS

| 3,093,422 | 6/1963 | Packer et al. | 303—21 |
| 3,223,459 | 12/1965 | Packer | 303—21 |

FOREIGN PATENTS 975,252  11/1964  Great Britain.

FERGUS S. MIDDLETON, *Primary Examiner.*

JOHN J. McLAUGHLIN, Jr., *Assistant Examiner.*

U.S. Cl. X.R.

188—181; 303—6

U.S. DEPARTMENT OF COMMERCE
PATENT OFFICE
Washington, D.C. 20231

UNITED STATES PATENT OFFICE
CERTIFICATE OF CORRECTION

Patent No. 3,441,320

April 29, 1969

Donald M. Flory

It is certified that error appears in the above identified patent and that said Letters Patent are hereby corrected as shown below:

Column 1, line 36, "vehicle wheel brake arrangement" should read -- syste and method employed in combination with a vehicle wheel brake arrangement --. Column 4, line 68 and column 5, line 39, "presure", each occurrence, should re -- pressure --. Column 9, line 71, "are" should read -- rate --. Column 10, line 50, "pressurized" should read -- pressurizing --. Column 13, line 3, "deceleration" should read -- acceleration --.

Signed and sealed this 21st day of April 1970.

(SEAL)
Attest:

Edward M. Fletcher, Jr.
Attesting Officer

WILLIAM E. SCHUYLER, JR.
Commissioner of Patents